//(12) United States Patent
Nakamura

(10) Patent No.: US 8,731,393 B2
(45) Date of Patent: May 20, 2014

(54) OPTICAL APPARATUS INCLUDING LIGHT AMOUNT ADJUSTING APPARATUS

(75) Inventor: Hidekazu Nakamura, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 0 days.

(21) Appl. No.: 13/111,076

(22) Filed: May 19, 2011

(65) Prior Publication Data

US 2011/0293258 A1 Dec. 1, 2011

(30) Foreign Application Priority Data

May 26, 2010 (JP) ................................. 2010-120055

(51) Int. Cl.
*G03B 7/00* (2006.01)
(52) U.S. Cl.
USPC ............ 396/241; 396/485; 396/505; 352/212
(58) Field of Classification Search
CPC ............ G03B 7/00; G03B 7/08; G03B 7/085; G03B 7/095; G03B 7/02; G03B 7/06; G03B 7/14; G03B 7/24; G03B 7/36; G03B 7/40; G03B 7/42; G03B 7/44
USPC ............................ 396/241, 485, 505; 352/212
See application file for complete search history.

(56) References Cited

U.S. PATENT DOCUMENTS

| | | | |
|---|---|---|---|
| 2002/0008772 A1* | 1/2002 | Kaneda | 348/370 |
| 2004/0130653 A1* | 7/2004 | Nanjo et al. | 348/363 |
| 2005/0084774 A1* | 4/2005 | Katsuragi et al. | 430/7 |
| 2007/0248349 A1* | 10/2007 | Nanjo | 396/241 |
| 2008/0024653 A1* | 1/2008 | Ikeda | 348/362 |
| 2008/0037092 A1* | 2/2008 | Umezu et al. | 359/227 |
| 2009/0160944 A1* | 6/2009 | Trevelyan et al. | 348/187 |
| 2009/0322902 A1* | 12/2009 | Tengeiji et al. | 348/229.1 |

FOREIGN PATENT DOCUMENTS

| | | | |
|---|---|---|---|
| JP | 2002-055374 A | 2/2002 | |
| JP | 2007-292828 A | 11/2007 | |
| JP | 2008-003408 A | 1/2008 | |

\* cited by examiner

*Primary Examiner* — Clayton E LaBalle
*Assistant Examiner* — Fang-Chi Chang
(74) *Attorney, Agent, or Firm* — Rossi, Kimms & McDowell LLP

(57) ABSTRACT

An optical apparatus includes a stop having an aperture, two filter members each including a first area that includes a transmissive part and a gradation part having a transmittance that is lower than the transmittance of the transmissive part and that is changed in a moving direction of the filter member, an actuator that drives the two filter members, and a controller that controls the actuator. The two filter members are disposed so that both changing directions of densities of the gradation part and moving directions are opposite and the first area has a size capable of covering a whole of a first aperture. The controller controls the actuator so as to always move in an area between a first position and a second position. The transmissive part has a size that is incapable of covering the whole of the first aperture.

2 Claims, 7 Drawing Sheets

OPTICAL APPARATUS INCLUDING LIGHT AMOUNT ADJUSTING APPARATUS

BACKGROUND OF THE INVENTION

1. Field of the Invention

The present invention relates to an optical apparatus including an aperture stop and an ND filter.

2. Description of the Related Art

An optical apparatus including a light amount adjusting apparatus changes an area of a stop aperture using a plurality of stop blades to adjust a light amount reaching an image pickup element to obtain an appropriate exposure amount. In order to prevent the deterioration of an optical performance caused by a so-called small stop diffraction, the area of the stop aperture is controlled so as not to be smaller than a predetermined small stop aperture, and the light amount when taking a high luminance object using an ND filter that covers the small stop aperture is appropriately set (Japanese Patent Laid-Open No. 2002-55374, Japanese Patent Laid-Open No. 2007-292828, and Japanese Patent Laid-Open No. 2008-003408).

However, in the light amount adjusting apparatus disclosed in Japanese Patent Laid-Open No. 2002-55374, there is a case in which a position of the ND filter is controlled so that the ND filter covers a part of the small stop aperture, i.e. so as to be in a so-called half covering state. In the half covering state, since an aperture smaller than the small stop aperture, surrounded by an end part of the ND filter and an edge part of the small aperture, is formed, the small diffraction may be generated by this small aperture. Accordingly, even if the ND filter is provided, the deterioration of the image quality caused by the small stop diffraction cannot be sufficiently suppressed. The ND filter is manufactured by evaporating a film to reduce a transmittance on a transmissive plastic substrate, but a step (an optical path length difference) of a thickness of the substrate on a transmissive wavefront in the half covering state and the deterioration of the image quality caused by this step is generated.

In Japanese Patent Laid-Open No. 2007-292828 and Japanese Patent Laid-Open No. 2008-003408, the countermeasure of the deterioration of the image quality caused by the thickness of the ND filter is taken. However, since a whole of the stop aperture is covered by a transmissive part area of the ND, an extra area corresponding to the transmissive part area is necessary in a stroke direction of the ND filter. Therefore, as the stop aperture is larger, the size of the light amount adjusting apparatus has to become larger.

SUMMARY OF THE INVENTION

The present invention provides an optical apparatus including a small-size light amount adjusting apparatus that suppresses a deterioration of an image quality caused by an ND filter.

An optical apparatus as one aspect of the present invention includes a stop having an aperture whose size is variable, two filter members each including a first area that includes a transmissive part having a transmittance of 75% or more and a gradation part having a transmittance that is lower than the transmittance of the transmissive part and that is changed in a moving direction of the filter member, an actuator configured to drive the two filter members, and a controller configured to control the actuator. The two filter members are disposed so that a changing direction of a transmittance of the gradation part and a moving direction of one of the two filter members are opposite to a changing direction of a transmittance of the gradation part and a moving direction of the other of the two filter members respectively, and the first area constituting each of the two filter members has a size capable of covering a whole of a first aperture, where the aperture of the stop which is smaller than a full open stop aperture is the first aperture. The controller controls the actuator so as to always move without a halt an area between a first position where the first area of each of the two filter members is evacuated from the first aperture and a second position where the first area of each of the two filter members covers the whole of the first aperture. The transmissive part of each of the two filter members has a size that is incapable of covering the whole of the first aperture.

Further features and aspects of the present invention will become apparent from the following description of exemplary embodiments with reference to the attached drawings.

DESCRIPTION OF THE PREFERRED EMBODIMENTS

Figure 1:
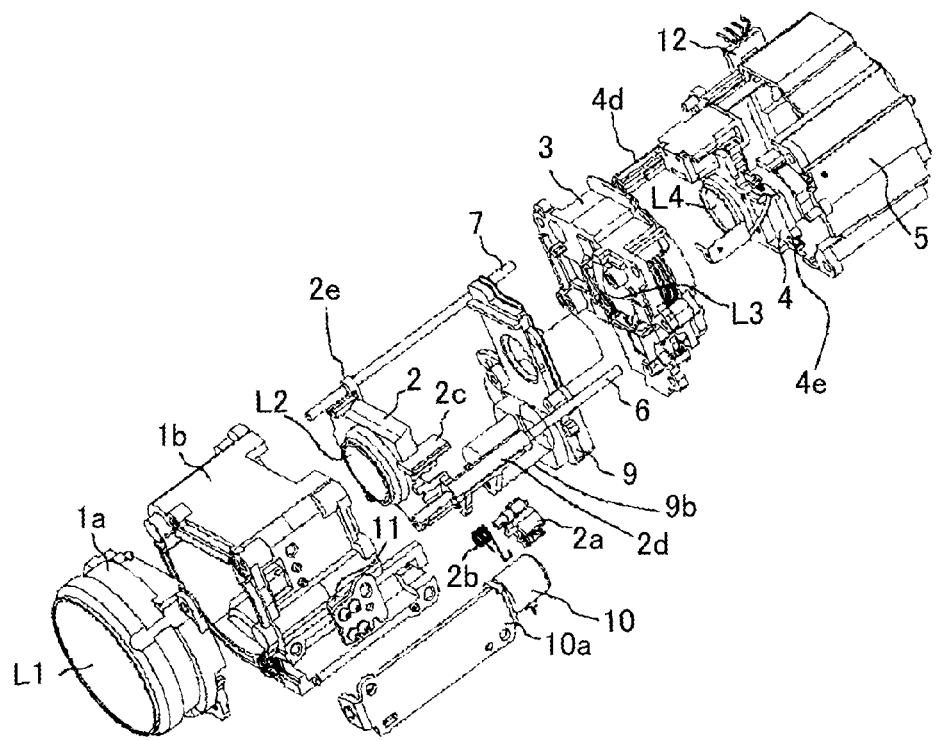
FIG. 1 is an exploded perspective view of a lens barrel of a video camera in the embodiment.

Exemplary embodiments of the present invention will be described below with reference to the accompanied drawings. In each of the drawings, the same elements will be denoted by the same reference numerals and the duplicate descriptions thereof will be omitted.

Figure 2:
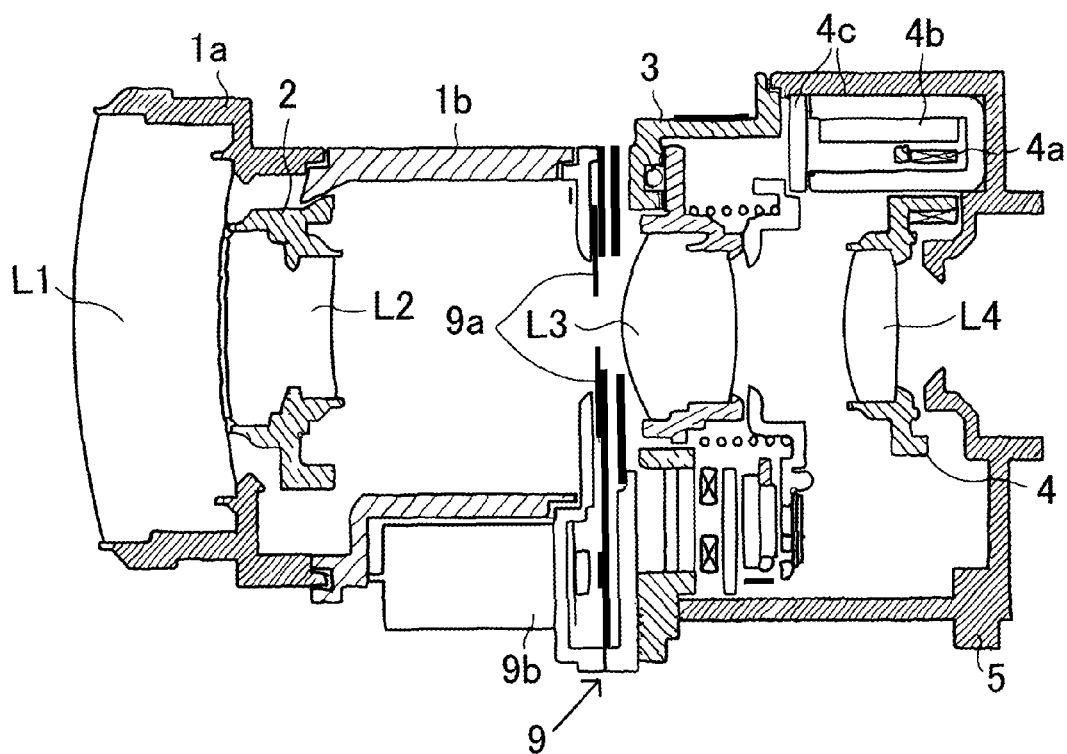
FIG. 2 is a cross-sectional view of the lens barrel of the video camera in the embodiment.

First of all, a video camera (an optical apparatus) in the embodiment of the present invention will be described. FIG. 1 is an exploded perspective view of a lens barrel of the video camera in the present embodiment. FIG. 2 is a cross-sectional view of the lens barrel. The lens barrel incorporates a magnification-varying optical system as an image pickup optical system configured by four lens units of convex, concave, convex, and convex lens units in order from an object side.

Hereinafter, an object side and an image pickup element side may be referred to as a front side and a rear side, respectively.

In FIGS. 1 and 2, in order from the object side (a left side in FIG. 2), L1 denotes a fixed first lens unit, L2 denotes a second lens unit that moves in an optical axis direction to vary a magnification. L3 denotes a third lens unit that moves in a direction orthogonal to the optical axis to perform an image-shake correction, and L4 denotes a fourth lens unit that moves in the optical axis direction to perform a focusing operation.

Reference numeral 1a denotes a front lens barrel that holds the first lens unit L1, and reference numeral 1b denotes a fixed lens barrel that fixes the front lens barrel 1a. Reference numeral 2 denotes a second moving frame that holds the second lens unit L2, and reference numeral 3 denotes a shift unit that holds the third lens unit L3 so as to be movable in the direction orthogonal to the optical axis. Reference numeral 4 denotes a fourth moving frame that holds the fourth lens unit L4, and reference numeral 5 denotes a rear lens barrel that an image pickup element 15 (see FIG. 3) such as a CCD sensor or a CMOS sensor converting an optical image into an electric signal is attached to. Two guide bars 6 and 7 are fixed between the fixed lens barrel 1b and the rear lens barrel 5. A sleeve portion 2d provided on the second moving frame 2 movably engages with the guide bar 6 to be guided in the optical axis direction. A U-groove portion 2e provided on the second moving frame 2 movably engages with the guide bar 7 to prevent a rotation of the second moving frame 2 around the guide bar 6. A sleeve portion 4d provided on the fourth moving frame 4 movably engages with the guide bar 7 to be guided in the optical axis direction. A U-groove portion 4e provided on the fourth moving frame 4 movably engages with the guide bar 6 to prevent a rotation of the fourth moving frame 4 around the guide bar 7.

The shift unit 3 is positioned with reference to the rear lens barrel 5, and is disposed to be held between the rear lens barrel 5 and the fixed lens barrel 1b. Reference 9 denotes a light amount adjusting unit (a light amount adjusting apparatus) that adjusts a light amount which reaches the image pickup element 15 converting the optical image formed by a light that enters the image pickup optical system and that passes through an aperture of a stop. The light amount adjusting unit 9 includes a stop having an aperture whose size (diameter) is variable. Specifically, two stop blades 9a illustrated in FIG. 2 is moved by a driving force of a stop motor 9b configured by a stepping motor in the direction orthogonal to the optical axis to change the size of the aperture. The light amount adjusting unit 9 is provided with an ND (Neutral Density) filter as a filter member so as to be evacuated from an optical path independently of the blades 9a. The detail of the ND filter will be described below. The light amount adjusting unit 9 is fixed on the shift unit 3 by a screw (not shown) from the front.

The fixed lens barrel 1b is positioned with reference to the rear lens barrel 5, and the shift unit 3 is disposed between the fixed lens barrel 1b and the rear lens barrel 5 as described above. The fixed lens barrel 1b is screwed along with the shift unit 3 by three screws (not shown) from the behind. The front lens barrel 1a, the fixed lens barrel 1b, and the rear lens barrel 5 constitutes a lens barrel body.

Reference numeral 4a denotes a coil, reference numeral 4b denotes a drive magnet, and reference numeral 4c denotes a yoke that closes a magnetic flux, and these constitute a focus drive unit that moves the fourth lens unit L4 (the fourth moving frame 4) in the optical axis direction. When an electric current is applied to the coil 4a, the Lorentz force is generated by a mutual repulsion of magnetic field lines between the coil 4a and the magnet 4b, and the fourth lens unit L4 is driven in the optical axis direction along with the fourth moving frame 4. The fourth moving frame 4 holds a sensor magnet (not shown) that is a multipolar magnet in the optical axis direction. An MR sensor 12 that reads a change of the magnetic field lines caused by the movement of the sensor magnet is fixed on the rear lens barrel 5. A position of the fourth moving frame 4 (the fourth lens unit L4) is detected by this configuration.

Reference numeral 10 is a zoom motor that moves the second lens unit L2 in the optical axis direction, which is configured by a stepping motor. A front end portion of an output shaft of the zoom motor 10 is rotatably held by a bearing formed at a front side of a holding plate 10a having a horizontally-long U shape. The vicinity of a rear end portion of this output shaft is rotatably held by a bearing formed at a rear side of the holding plate 10a. A lead screw is formed on the output shaft of the zoom motor 10, and a rack 2a attached to the second moving frame 2 engages with the lead screw. Therefore, when the zoom motor 10 rotates, the second moving frame 2 is driven in the optical axis direction by the engagement action between the lead screw and the rack 2a. A torsion coil spring 2b presses each of the second moving frame 2, the guide bars 6 and 7, the second moving frame 2, the rack 2a, and the lead screw to one side to prevent the backlash between them.

Reference numeral 11 denotes a zoom reset switch that includes a photo interrupter. The zoom reset switch 11 optically detects the movement of a light shielding portion 2c formed on the second moving frame 2 to output an electric signal. Thus, a CPU 37 as a control circuit (a controller) described below can determine whether or not the second moving frame 2 (the second lens unit L2) is located at a reference position. The zoom reset switch 11 is fixed on the front lens barrel 1 by a screw via a substrate.

Figure 3:
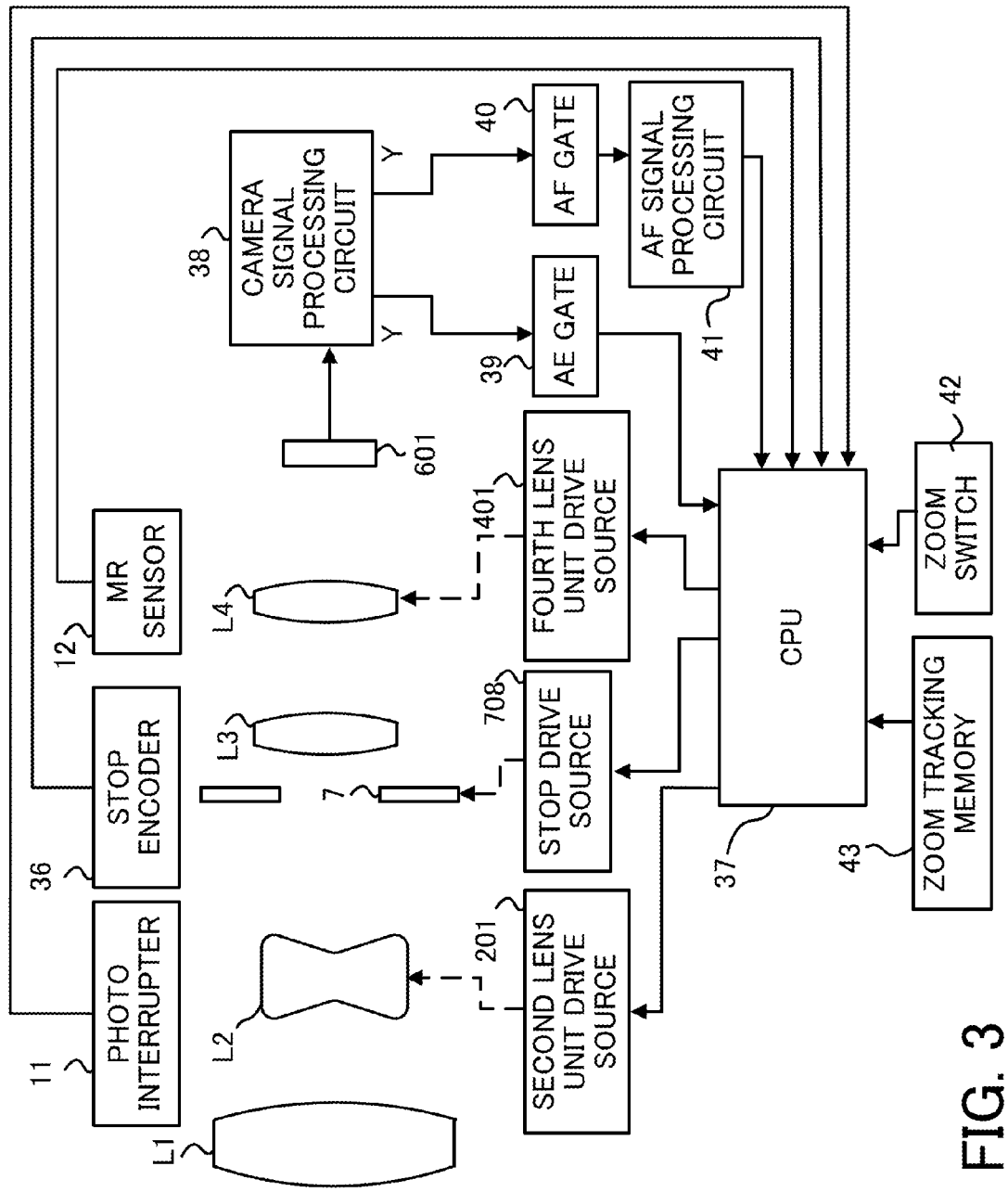
FIG. 3 is a block diagram illustrating an electric configuration of the video camera in the embodiment.

Next, referring to FIG. 3, an electric configuration of the video camera in the present embodiment will be described. FIG. 3 is a block diagram illustrating the electric configuration of the video camera. In FIG. 3, with regard to configuration elements of the lens barrel described with reference to FIGS. 1 and 2, the same elements will be denoted by the same reference numerals and the duplicate descriptions thereof will be omitted. Reference numeral 37 denotes a CPU that controls the video camera. The CPU 37 controls a second lens unit drive source 201 and a fourth lens unit drive source 401 that control the second lens unit L2 and the fourth lens unit L4, respectively. The CPU 37 (the controller) controls a stop drive source 708 that drives the stop blade 9a.

Reference numeral 38 denotes a camera signal processing circuit, which performs a predetermined amplification process and gamma correction for an output of the image pickup element 15 for example. A video signal for which the predetermined processes have been performed is transmitted to an AE gate 39 and an AF gate 40. In each of the AE gate 39 and the AF gate 40, a retrieving range of the signal which is optimal for an exposure determination and a focusing is set out of whole of a screen area. The size of each gate may be variable, and alternatively a plurality of gates may be provided for each of the gates. Reference numeral 41 denote an AF signal processing circuit that generates an AF signal to perform an AF (autofocus) operation, which generates an AF evaluation value signal to perform a contrast AF based on a high-frequency component of the video signal. Reference numeral 42 denotes a zoom switch that is operated by a user, and reference numeral 43 denotes a zoom tracking memory. The zoom tracking memory 43 stores an object distance and position information of the fourth lens unit L4 that is to be set in accordance with a position of the second lens unit L2 in varying the magnification. A memory embedded in the CPU 37 may also be used as the zoom tracking memory 43.

For example, when the zoom switch 42 is operated by the user, the CPU 37 drives the zoom motor 10. At the same time, the CPU 37 controls the conduction of the current to the focus drive unit (the coil 4a) so that the position of the fourth lens unit L4 is equal to a position read out from the zoom tracking memory 43 in accordance with the position of the second lens unit L2 and the object distance.

In the AF operation, the CPU 37 controls the conduction of the current to the focus drive unit so that the AF evaluation value signal from the AF signal processing circuit 41 is peaked, i.e. so that the signal is maximized. Furthermore, in order to obtain a proper exposure, the CPU 37 (the controller) controls the stop motor 9b that is an actuator based on an average value of an output of a Y signal passing through the AF gate 39. Thus, the size of the aperture of the stop (the aperture diameter) can be controlled. Reference numeral 36 denotes a stop encoder that is provided in the light amount adjusting unit 9, which detects the position of the stop blade 9a, i.e. the aperture diameter of the stop.

Figure 4:
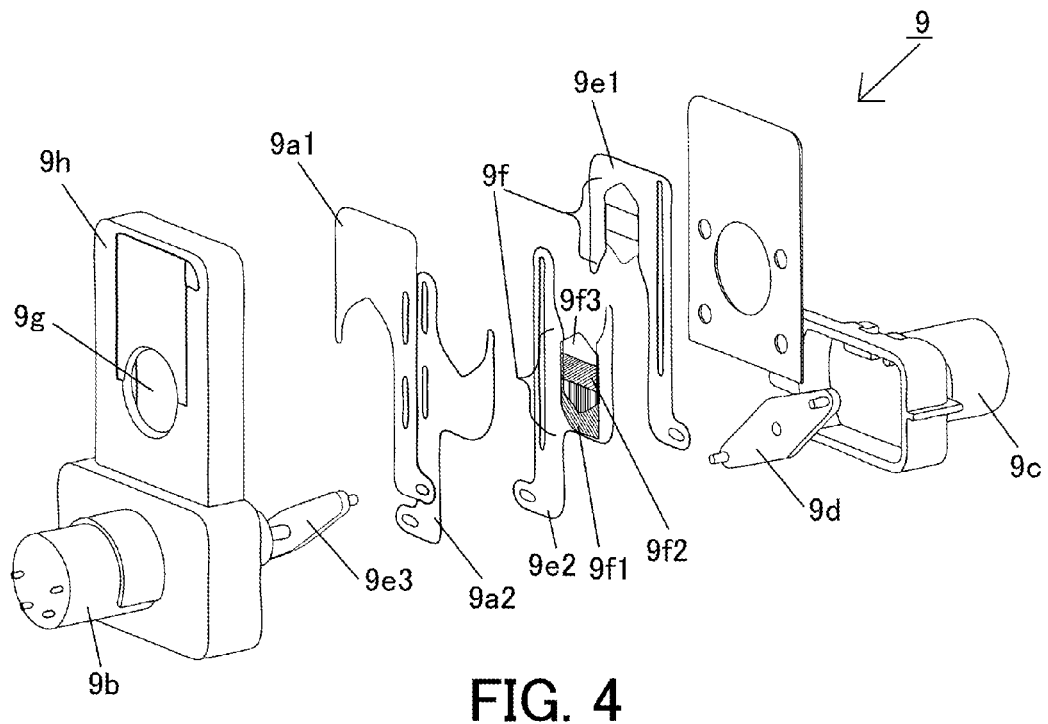
FIG. 4 is an exploded perspective view of a light amount adjusting unit in the embodiment.

Next, referring to FIG. 4, the light amount adjusting unit 9 of the present embodiment will be described in detail. FIG. 4 is an exploded perspective view of the light amount adjusting unit 9. The light amount adjusting unit 9 includes a stop ground plate 9h in which a fixed stop aperture 9g is formed, two stop blades 9a1 and 9a2 (stop), and a drive lever 9a3 that is connected with the output shaft of the stop motor 9b and the stop blades 9a1 and 9a2. The two stop blades 9a1 and 9a2 are driven in directions opposite to each other by the operation of the stop motor 9b, and the size (the diameter) of the aperture formed by both the stop blades 9a1 and 9a2 is changed. The light amount adjusting unit 9 is also referred to as a so-called guillotine stop.

The light amount adjusting unit 9 includes ND filters 9f that are configured by two filter members. Each of the two ND filters 9f includes a transmissive part having a uniform transmittance and a gradation part having a transmittance that is continuously changed. The two ND filters 9f are attached to the ND holding plates 9e1 and 9e2, respectively. Reference numeral 9c denotes an ND motor that is an actuator to drive the ND filters 9f (the ND holding plates 9e) to back and forth independently of the stop blades 9a. The ND motor 9c is controlled by the CPU 37 as a controller. The output shaft of the ND motor 9c is connected with an ND drive arm 9d, and the ND drive arm 9d is connected with the ND holding plate 9e. Therefore, the ND filters 9f are driven in parallel to the aperture surface of the stop by the operation of the ND motor 9c that is an actuator.

The ND filter 9f, in order from the front side in an insertion direction into the optical path, includes a transmissive part 9f3, a gradation density part 9f2 (a gradation part), and a maximum density part 9f1. In the present embodiment, an area in which the ND filter 9f is evacuated from the aperture diameter of the stop corresponds to a first area, and an ND filter insertion area (the transmissive part 9f3, the gradation density part 9f2, and the maximum density part 9f1) corresponds to a second area. The ND filters 9f are disposed so that changing directions and moving directions of the gradation (the transmittance) of the gradation density part 9f2 are opposite to each other, and is configured to be capable of covering whole of the aperture. The ND filter 9f is configured by forming the gradation density part 9f2 and the maximum gradation part 9f1 with an evaporation film, except for an end portion of a clear and colorless plastic substrate. The end portion where the evaporation film is not formed is a transmissive part 9f3. The term "clear and colorless" is not limited to be completely clear and colorless, but it means an estimated state in which a color change or a luminance change in a shot image is not generated when the transmissive part 9f3 moves back and forth for the optical path. It is preferable that the transmittance of the transmissive part 9f3 is set in a range of 75 to 100%. More preferably, the transmittance is set in a range of 87.5 to 100%. The transmissive part 9f3 is, as described below, set so as to cover a part of the stop aperture that corresponds to F4.0.

The maximum density part 9f1 is, for example set to a density of ND1.0. The gradation density part 9f2 that gradually becomes denser (lower in transmittance) toward the maximum density part 9f1 is provided between the transmissive part 9f3 and the maximum density part 9f1 to generate density steps in the stop aperture to be able to prevent the deterioration of the MTF. The density difference between adjacent density areas in the gradation density part 9f2 is set to less than or equal to ND0.3 in order to prevent the abrupt change of the luminance. It is preferable that a thickness step between a surface of the transmissive part 9f3 and a surface of the evaporation film of the minimum density of the gradation density part 9f2, and a thickness step between surfaces of evaporation films of respective densities in the gradation density part 9f2 and the maximum density part 9f1 are less than or equal to one third of the minimum wavelength to which the image pickup element 15 is sensitive. Thus, the deterioration of the MTF caused by the thickness step can be effectively suppressed. The plastic substrate is formed as one plate having a simple plane plate shape which does not include a step such as a hole to transmit light.

Figure 5:
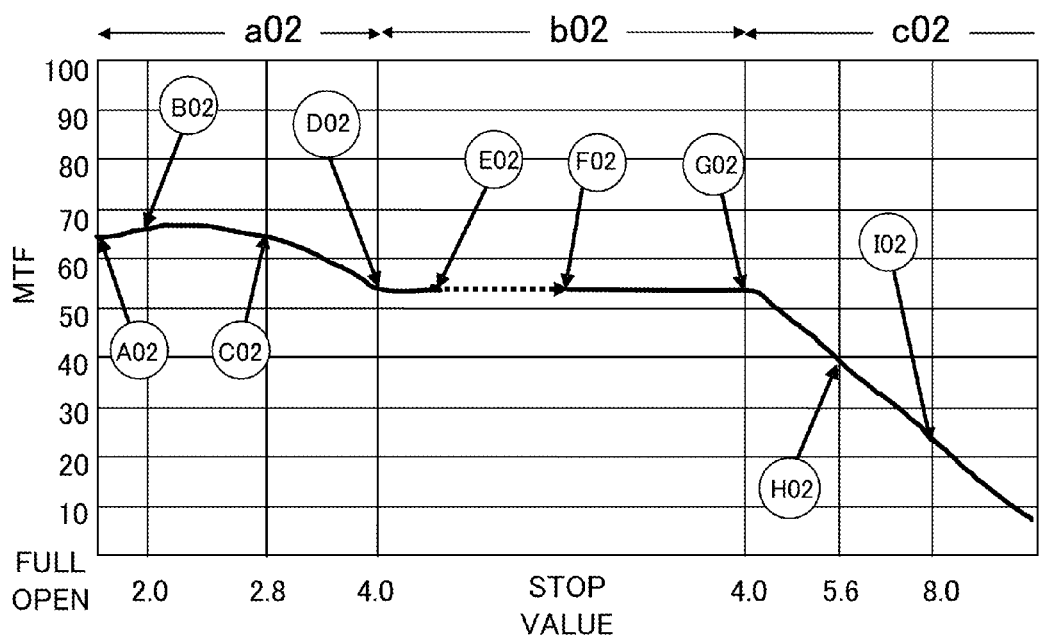
FIG. 5 is a graph illustrating a relationship between a light amount adjustment performed by the light amount adjusting unit and the MTF in the embodiment.
Figure 6A:
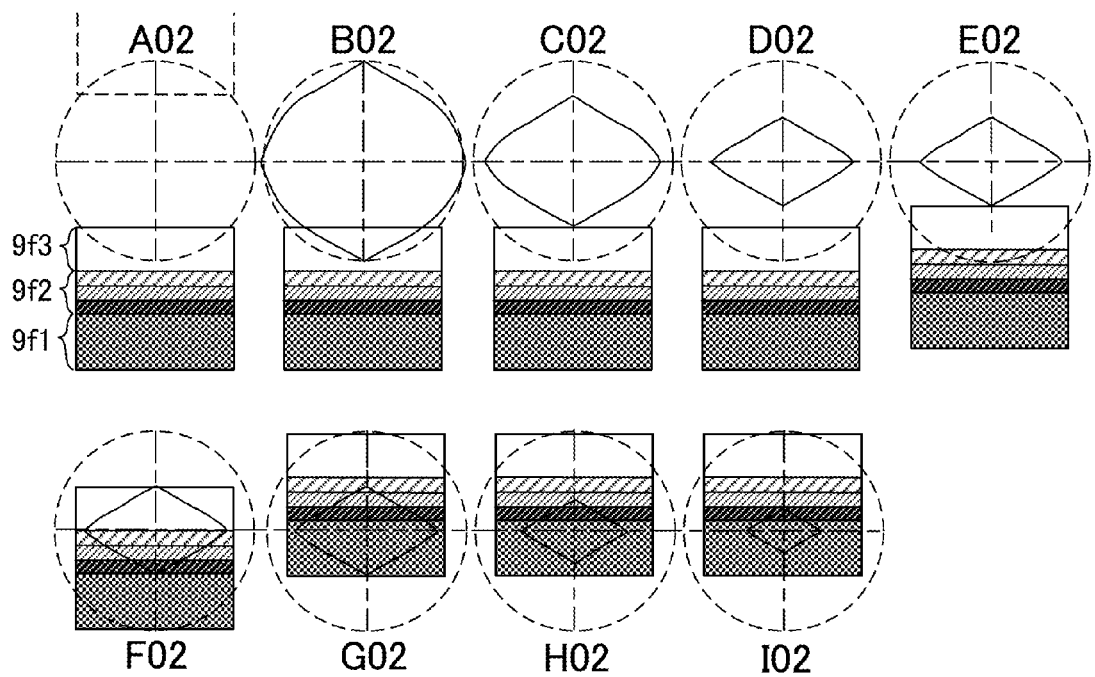
FIG. 6A is a plan view illustrating states in various kinds of operating positions of the light amount adjusting unit in the embodiment.
Figure 6B:
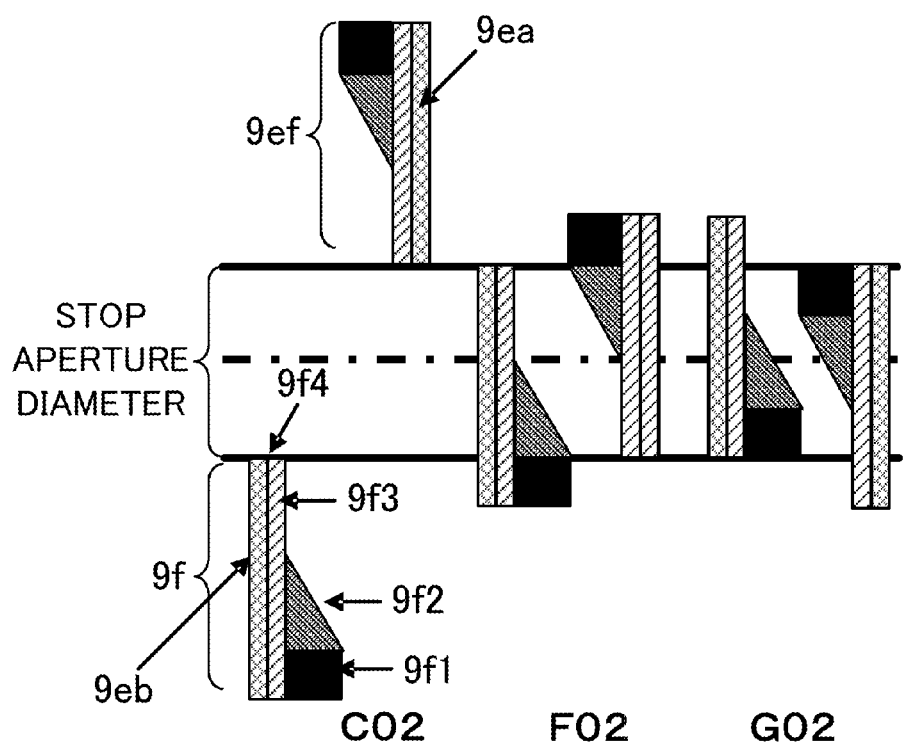
FIG. 6B is a cross-sectional view illustrating states in several kinds of operating positions of the light amount adjusting unit in the embodiment.

Next, referring to FIGS. 5, 6A, and 6B, a method of controlling the light amount adjusting unit 9 will be described. FIG. 5 illustrates a relationship between a transmissive light amount (T number) of the light amount adjusting unit 9 and the MTF (modulation transfer function) of the lens barrel. The light amount transmitting through the light amount adjusting unit 9 is controlled by the combination of the change of the area of the stop aperture having a substantially rhombic shape formed by the two stop blades 9a1 and 9a2 and the change of the insertion state of the ND filters 9f. FIG. 6A illustrates an appearance (appearance viewing from the optical axis direction) of the controls of the stop aperture and the insertion state of the ND filters 9f so as to reduce the transmissive light amount of the light amount adjusting unit 9, in order of positions A02 to I02. FIG. 6B illustrates an appearance of the controls of the stop aperture and the insertion state of the two ND filters 9f. The positions A02, B02, . . . , I02 in FIGS. 6A and 6B correspond to the state to which the same symbol is attached on the graph of FIG. 5. Hereinafter, the two stop blades 9a1 and 9a2 are collectively indicated as a stop blade 9a. Since the operations of the two ND filters 9f are symmetric in an upward and downward direction, the operations of the ND filters 9f of FIG. 6A are indicated only for the stop blade 9a2 (a lower side to a upper side).

In order to reduce the transmissive light amount of the light amount adjusting unit 9, first of all, the area of the stop aperture is decreased (a range a02 in FIG. 5). Next, the ND filter 9f is being inserted (a range b02 in FIG. 5). After the ND filters 9f are entirely inserted (whole of the stop aperture is covered), the area of the stop aperture is decreased again (a range c02 in FIG. 5). The position A02 is an open state in which the stop blade 9a is evacuated to the outside of the fixed stop aperture 9g that is a full open stop aperture. In this open state (A02), apart of the transmissive part 9f3 of the ND filter 9f covers a part of the full open stop aperture. Alternatively, the ND filter 9f may also be evacuated to the outside of the full open stop aperture completely.

Next, the stop blade 9a is driven to the position B02 that corresponds to F2.0. Thus, the light amount decreases and the value of the MTF increases. Furthermore, the light amount decreases during the drive of the position C02 corresponding to F2.8 to the position D02 corresponding to F4.0, and the MFT gradually decreases. Then, the insertion drive of the ND filter 9f starts in a state where the stop aperture is fixed to an aperture area corresponding to F4.0 (an aperture changed to a predetermined size).

The position E02 indicates a state immediately before the end 9f4 in the insertion direction of the ND filter 9f comes into the stop aperture of F4.0 (a first position). The position F02 indicates a state in which whole of the stop aperture of F4.0 is covered with the transmissive part 9f3 and the gradation density part 9f2 after the insertion of the ND filter 9f is completed. In the range of the positions E02 to F02, the ND filter 9f is controlled so as not to be stopped. In other words, the end 9f4 of the ND filter 9f always moves in a position corresponding to an inside of the stop aperture of F4.0, and it does not stop. Thus, the CPU 37 controls the ND motor 9c so as not to be stopped in a range between the first position where the ND filter 9f is evacuated from the aperture and the second position where it covers the whole of the aperture when the aperture is changed to a predetermined size (for example, F4.0). The transmissive parts 9f3 of the two ND filters 9f are configured so as not to be overlapped with each other in a direction orthogonal to an aperture surface of the stop when the ND filters 9f are located at the second position.

In FIG. 5, a dotted arrow connecting the position E02 to the position F02 means that the ND filters 9f are controlled so as to always move from the position E02 to the position F02 without a halt. In this case, since the gradation density parts 9f2 of the two ND filters 9f cover half of the stop aperture of F4.0, a constant luminance change is generated. Thus, the CPU 37 controls at least one of the stop blade (the size of the aperture of the stop), and a gain or an electronic shutter velocity of the image pickup element 15 for the luminance change generated in inserting the ND filters 9f. The light amount adjustment is performed by the control so as to reduce the level where the luminance change is not recognized in an image pickup state. This operation does not generate a significant change of the luminance or the MTF as described below.

A length of the transmissive part 9f3 in the insertion direction is set to a length corresponding to longer than or equal to a radius of the stop aperture of F4.0. It is because the size of the ND filter is enlarged and the reductions of the light amount adjusting unit 9 including it and the video camera are prevented if the transmissive part 9f3 is longer than necessary. On the contrary, if the length of the transmissive part 9f3 in the insertion direction is short, the color change and the luminance change of the shot image are increased when inserting it as described above. Therefore, it is preferable that the length of the transmissive part 9f3 in the insertion direction is appropriately set considering the size which is allowed for the light amount adjusting unit 9 and the light amount correcting control of the color change or the luminance change generated in inserting the ND filters 9f. It is preferable that the length of the whole of the ND filter 9f in the insertion direction is set to a length that corresponds to the aperture diameter of the open stop.

It is preferable that the ND filter 9f is driven from the position E02 to the position F02 at a velocity as high as possible, for example at the maximum velocity of the ND filter 9f that can be driven by the ND motor 9c that is an actuator. However, a velocity may be allowed if it is not seriously low compared with an image retrieving velocity (a time required for retrieving one field image, for example 60 fields/sec) from the image pickup element 15 that converts the optical image formed by the light passing through the stop aperture of the video camera into the electric signal. In other words, the velocity may be allowed if the deterioration of the MTF is not remarkable. For example, it is preferable that the movement of the ND filter 9f between the positions E02 and F02 is performed at a velocity lower than or equal to a half second. More preferably, the movement of the ND filter 9f between the positions E02 and F02 (or between the positions F02 and E02) is set to be performed at a velocity lower than or equal to one quarter second that is a time required for retrieving fifteen field images. However, if it is in a range capable of suppressing the deterioration of the MTF as a camera system, the ND filter 9f may also be set to stop for a moment between the positions E02 and F02.

Then, the ND filter 9f is driven up to a position where the whole of the stop aperture of F4.0 is covered with the maximum density part 9f1 and the gradation density part 9f2 (position G02). Subsequently, the transmissive light amount decreases since the area of the stop aperture is reduced again while the ND filter 9f stops (positions H02 and I02). The MTF is deteriorated by the influence of a small stop diffraction at positions G02 to I02.

Figure 7:
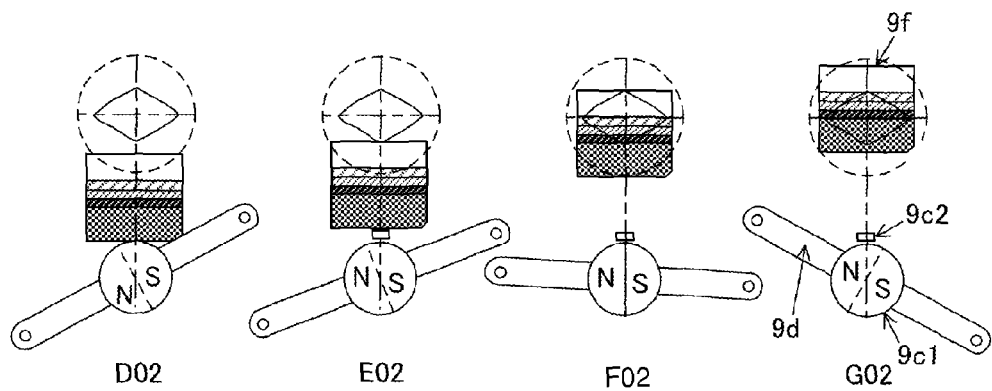
FIG. 7 is a plan view illustrating a method of detecting a position of the ND filter in the embodiment.
Figure 8:
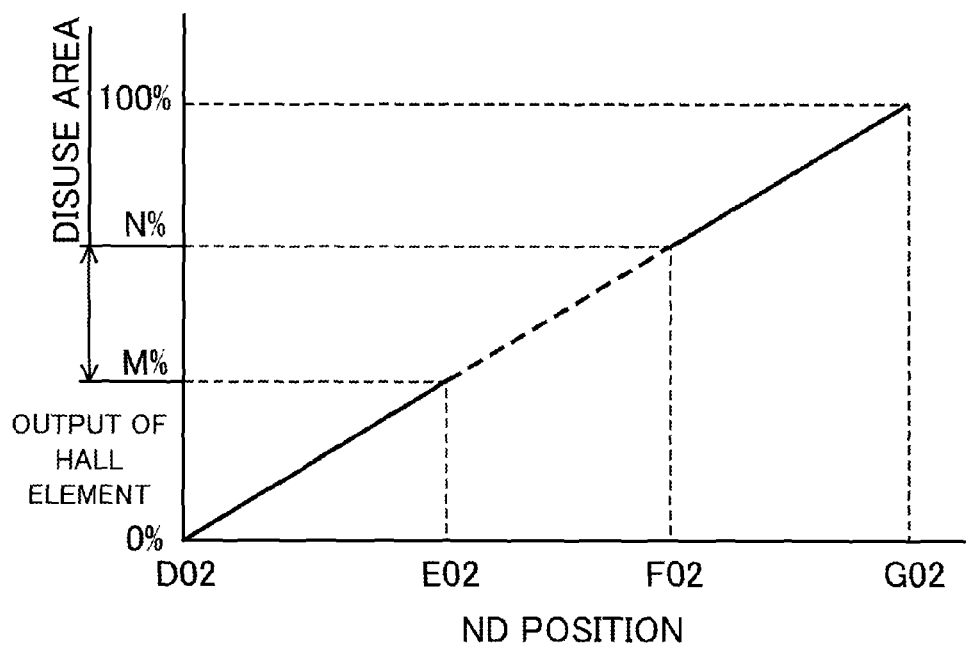
FIG. 8 is a graph illustrating a relationship between the position of the ND filter and an output of a magnetic sensor in the embodiment.

Next, referring to FIGS. 7 and 8, a specific method of performing a control so as to always move the end 9f4 of the ND filter 9f in the stop aperture (F4.0) without a halt will be described. FIG. 7 is a plan view illustrating a method of detecting a position of the ND filter in the present embodiment. FIG. 8 is a graph illustrating a relationship between the position of the ND filter and the output of the magnetic sensor. Hereinafter, the method will be described using the ND filter 9f of the ND frame 9e2 selected from the two ND frames 9e1 and 9e2.

As illustrated in FIG. 7, a drive magnet 9c1 is disposed inside the ND motor 9c, and the magnet 9c1 is connected with the ND drive arm 9d. The ND filter 9f mounted on the ND holding plate 9e moves in accordance with the rotation of the magnet 9c1. In order to detect a rotational angle of the magnet 9c1, a magnetic sensor 9c2 is disposed near a magnetized boundary of the N pole and the S pole of the magnet 9c1. The magnetic sensor 9c2 outputs a signal depending on the position of the ND filter 9f. As the magnetic sensor 9c2, a hall element or the like can be used. Since a rotational angle of the magnet 9c1 and an output value of the magnetic sensor 9c2 substantially have a linear relation, the position of the ND filter 9f and the output of the magnetic sensor 9c2 also have a linear relation as illustrated in FIG. 8.

In the embodiment, an output of the magnetic sensor 9c2 in the position E02 immediately before the end 9f4 of the ND filter 9f starts to cover the stop aperture of 4.0 that is formed by the stop blade 9a is defined as M %. An output of the magnetic sensor 9c2 at the position F02 where the whole of the stop aperture of F4.0 is covered with the transmissive part 9f3 (or the transmissive part 9f3 and part of the gradation density part 9f2) is defined as N % (N>M). In this case, the control of always moving the ND filter 9f without stopping the end 9f4 of the ND filter 9f in the stop aperture of F4.0 is a control in which an area where an output A of the magnetic sensor 9c2 is in a range of M %<A<N % is a disuse area. Actually, the relation between the output of the magnetic sensor 9c2 and the position of the ND filter 9f varies in accordance with the attachment error of the ND filter 9f or the like. Therefore, considering a margin α, it is preferable that an area in a range of (M−α) %<A<(N+α) % is the disuse area.

Thus, the CPU 37 controls the ND motor 9c based on the signal from the magnetic sensor 9c2 when the ND filter 9f is out of the area between the first position and the second position. On the other hand, the CPU 37 controls the ND motor 9c so that the ND filter 9f moves this area independently of the signal from the magnetic sensor 9c2 when the ND filter 9f is in the area between the first position and the second position.

Figure 9:
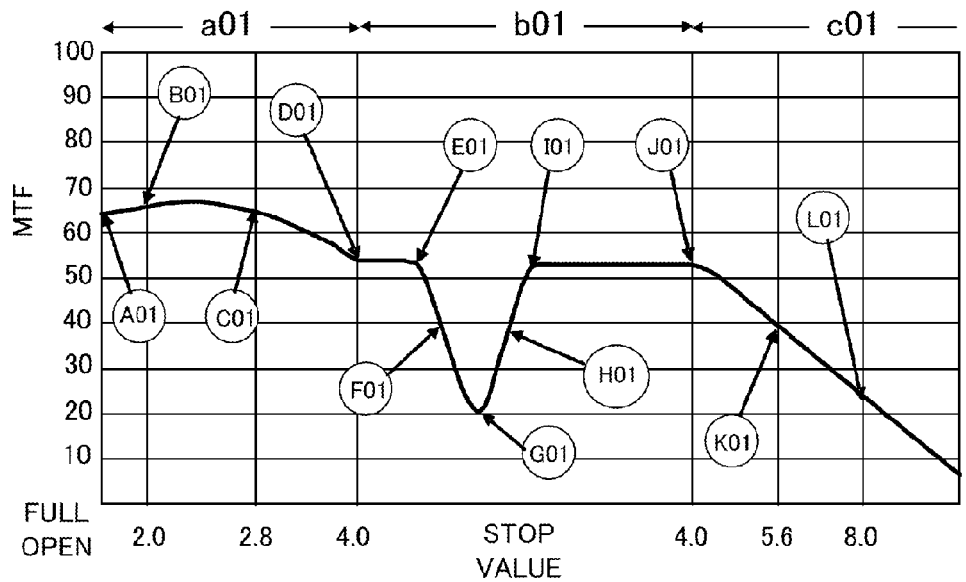
FIG. 9 is a graph illustrating a relationship between a light amount adjustment performed by a conventional light amount adjusting unit and the MTF.
Figure 10:
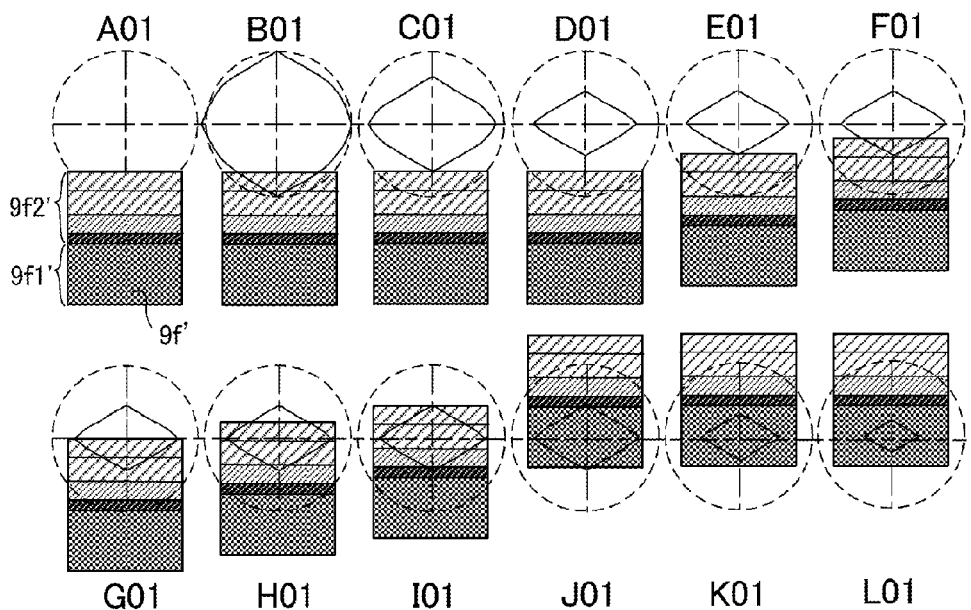
FIG. 10 is a plan view illustrating states in various kinds of operating positions of the conventional light amount adjusting unit.

FIG. 9 illustrates a relationship between the transmitted light amount of a conventional light amount adjusting unit and the MTF of the lens barrel. FIG. 10 illustrates appearances of controlling the stop aperture and the insertion states of the ND filter so as to reduce the transmitted light amount of the conventional light amount adjusting unit, in order from A01 to L01. The operation positions A01, B01, . . . , L02 correspond to the states to which the same symbols on the graph of FIG. 9 are applied. An ND filter 9f' illustrated in FIG. 10 is not provided with a transmissive part, and a gradation density part 9/2' and the maximum density part 9/1' are provided in order from the end.

The value of the MTF is increased by reducing the stop aperture from the position A01 of the open state to the position of B01 of F2.0. When the stop aperture is further reduced up to the position C01 of F2.8 and the position D01 of F4.0, the MTF is gradually deteriorated (the area a01 in FIG. 9). The light amount is decreased by inserting the ND filter from the position E01 immediately before the end of the ND filter starts to cover the stop aperture of F4.0 into the stop aperture (the area b01 in FIG. 9). In the positions F01 to H01 where the end of the ND filter is covering the stop aperture of F4.0, the deterioration of the MTF is generated by a diffraction in a small opening surrounded by the end of the ND filter and the edge part of the stop aperture or an optical path length difference that corresponds to a thickness of a substrate of the ND filter. Specifically, the deterioration of the MTF starts from the position E01, and the deterioration of the MTF is maximized at the position G01 where the end of the ND filter passes a center of the stop aperture (an optical axis center of the image pickup optical system). The state of the deterioration of the MTF continues until the ND filter reaches the position 101 where it covers the whole of the stop aperture of F4.0.

Next, the stop aperture is reduced again at the positions K01 and L01 (the area b01 in FIG. 9) after the whole of the stop aperture of F4.0 is covered with the maximum density part 9/1' at the position J01. In this time, the MTF is deteriorated by the influence of the small stop diffraction. Although the allowed deterioration of the MTF changes in accordance with a pixel pitch of the image pickup element, the allowed value of the MTF in the video camera is 40% in the embodiment. In this case, in the configuration and the control method of the conventional light amount adjusting unit illustrated in FIGS. 9 and 10, the deterioration of the video is recognized at the positions F01 to H01 and after the position K01. On the other hand, in the configuration and the control method of the light amount adjusting unit of the present embodiment, the deterioration of the video is not recognized until the position H02. In the present embodiment, the ND filter 9f (the ND motor 9c) is controlled to move so that the end of the ND filter does not stop inside the stop aperture which is changed to be smaller than the size of the full open stop aperture. As a result, the deterioration of the MTF can be suppressed.

In the present embodiment, the case in which the ND filter 9f is driven to be inserted after the size of the stop aperture is changed to a size corresponding to F4.0 is described, but the ND filter may also be driven to be inserted after the size of the stop aperture is changed to a size corresponding to another stop value, for example F5.6. The ND filter is inserted with an F value which is as small as possible or the smallest in a range where the deterioration of the image quality caused by the diffraction is allowed to be able to reduce the size of the area of the ND filter and therefore the sizes of the light amount adjusting unit and the video camera embedded with it are effectively reduced.

In addition, the length of the transmissive part 9/3 in the insertion direction is changed from a whole covering length to a part converting length with respect to the stop aperture of F4.0 to be able to shorten the length of the ND filter 9f. Therefore, the sizes of the light amount adjusting unit and the video camera mounting this are effectively reduced. Generally, it is preferable that the ND filter is inserted when the F value is an F value corresponding to the MTF value greater than or equal to 30% of the maximum resolution frequency of the video camera as a lower limit although specifically it also changes in accordance with the pixel pitch of the image pickup element as described above.

Figure 11:
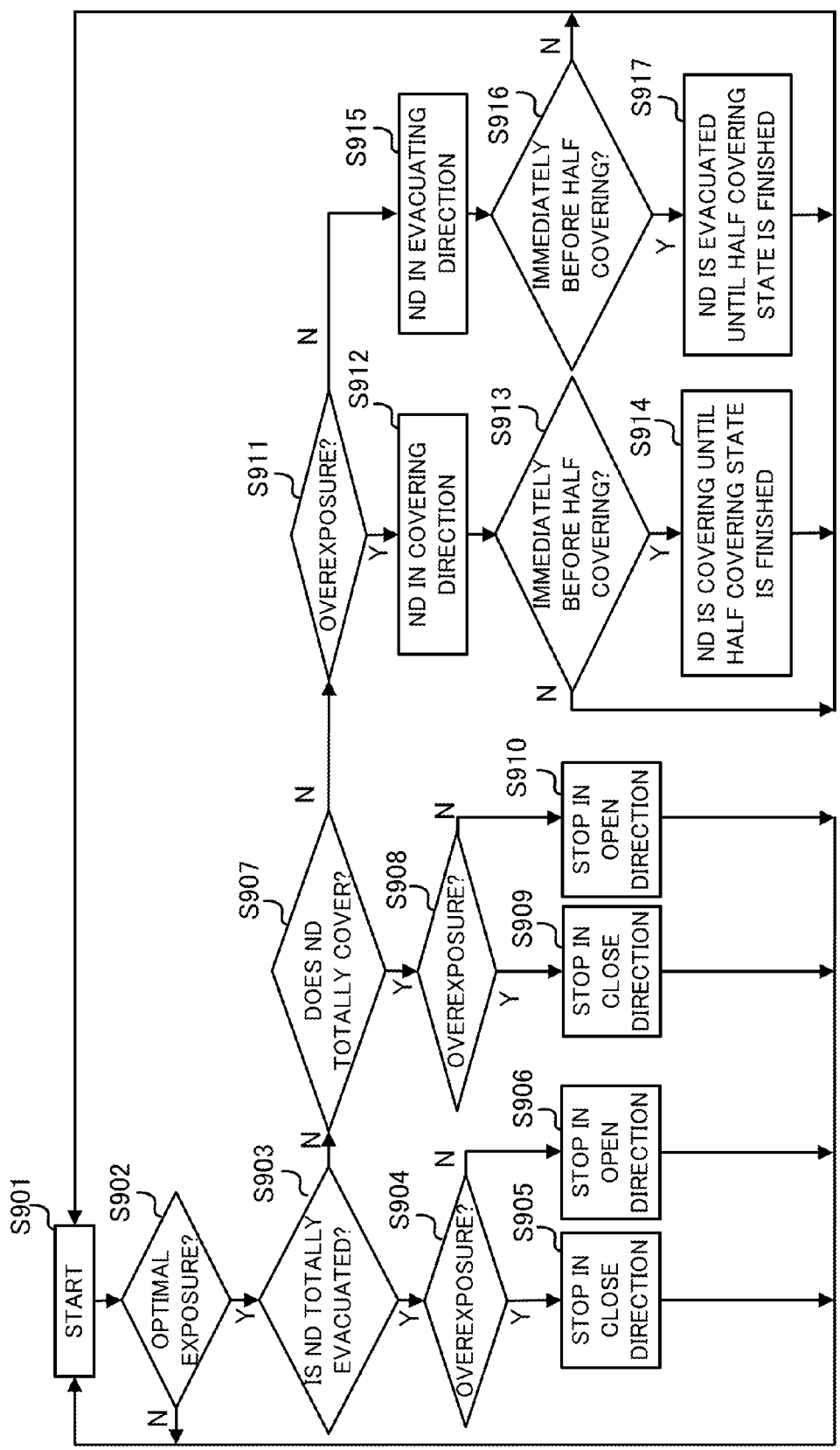
FIG. 11 is a flowchart illustrating a control sequence of the light amount adjusting unit in the embodiment.

Next, referring to FIG. 11, a control sequence of the light amount adjusting unit in the present embodiment will be described. The flowchart of FIG. 11 illustrates a sequence of a light amount feedback control in accordance with a brightness change of an object, which is performed by the CPU 37 in accordance with a computer program. In FIG. 11, symbol "Y" indicates yes, and symbol "N" indicates no. Symbol "S" indicates a step.

Starting with Step 901, first of all, the CPU 37 determines whether or not it the optimal exposure state is obtained with respect to the brightness of the current object based on an average value (a photometric value) of a Y signal output from the AE gate 39 in Step 902 illustrated in FIG. 3.

Next, in Step 903, the CPU 37 determines whether or not the ND filter 9f is at the evacuation position (the positions A02 to D02 illustrated in FIG. 6A). When the ND filter 9f is at the evacuation position, the CPU 37 determines whether it is in a state of an overexposure or underexposure in Step 904 since the exposure is controlled only by the drive of the stop blade 9a. When it is in a state of the overexposure, the stop motor 9b is controlled so as to move the stop blade 9a in a close direction in Step 905, and whether or not it is the optimal exposure is determined again in Step 902. On the other hand, when it is in a state of the underexposure in Step 904, the stop motor 9b is controlled so as to move the stop blade 9a in an open direction in Step 906, and whether or not it is the optimal exposure is determined in Step 902.

When the ND filter 9f is not at the evacuation position in Step 903, whether or not the ND filter 9f exists at the whole covering position (the positions G02 to 102 illustrated in FIG. 6A) is determined in Step 907. Whether it is the overexposure or the underexposure is determined in Step 908 even when it is located at the whole covering position because the exposure control is performed by the opening and closing operation of the stop. The stop motor 9b is controlled so as to move the stop blade 9a in the close direction in Step 909 when it is the overexposure, and on the other hand it is controlled so as to move the stop blade 9a in the open direction in Step 910 when it is the underexposure. Then, whether or not it is the optical exposure is determined again in Step 902.

When the ND filter 9f is not located at the whole covering position in Step 907, whether it is the overexposure or the underexposure is determined in Step 911. When it is the overexposure, the ND motor 9c is controlled so as to move the ND filter 9f in a covering direction (the insertion direction). In this case, whether or not it is in a state where the end 9/4 of the ND filter 9a is located immediately before covering the stop aperture of F4.0 (immediately before a half covering state in the insertion direction) is determined in Step 913 since the end 9/4 of the ND filter 9f is controlled so as to not to stop inside the stop aperture of F4.0. This state corresponds to the position E02 illustrated in FIG. 6A. If it is immediately before the half covering state in the insertion direction, in Step 914, the ND motor 9c is controlled so as to always move the ND filter 9f to the position F02 illustrated in FIG. 6A at high velocity without a halt.

On the other hand, when it is the underexposure in Step 911, the ND motor 9c is controlled so as to move the ND filter 9f in the evacuation direction in Step 915. In this case, whether or not it is in a state where the end 9f4 of the ND filter 9a is immediately before covering the stop aperture of F4.0 (immediately before a half covering state in the evacuation direction) is determined in Step 916 since the end 9f4 of the ND filter 9f is controlled so as not to stop inside the stop aperture of F4.0. This state corresponds to the position F02 illustrated in FIG. 6A. If it is immediately before the half covering state in the evacuation direction, in Step 917, the ND motor 9c is controlled so as to always move the ND filter 9f to the position E02 illustrated in FIG. 6A at high velocity without a halt. The CPU 37 performs the light amount adjustment so as not to generate significant luminance change with respect to the luminance change generated when the ND filter 9f is completely inserted into the position E02 by the control of the gain of the image pickup element, the electronic shutter velocity, or the like.

As described above, according to the present embodiment, the ND filter can be operated so as not to generate a state in which the ND filter covers only part of the stop aperture (the half covering state). Therefore, the deterioration of the image quality caused by the half covering state can be suppressed. Furthermore, a first aperture can be covered with a first area in inserting and evacuating a second area with respect to the aperture, and the deterioration of the image quality caused by an optical path length difference of a thickness of the ND filter can be suppressed. In addition, the transmissive part is changed from the whole covering state to the part covering state with respect to the aperture to reduce the length of the transmissive part, and the size of the light amount adjusting unit can be reduced.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions. For example, the above embodiment describes the video camera which is integrally provided with a lens, but the present invention can also be applied to other optical apparatuses such as a digital still camera which is integrally provided with a lens or an interchangeable lens.

This application claims the benefit of Japanese Patent Application No. 2010-120055, filed on May 26, 2010, which is hereby incorporated by reference herein in its entirety.

What is claimed is:

1. An optical apparatus comprising:
a stop having an aperture whose size is variable;
two filter members each including a first area that includes (i) a transmissive part having a transmittance of 75% or more and (ii) a gradation part having a transmittance that is lower than the transmittance of the transmissive part, the transmittance of the gradation part being changed in a moving direction of the filter member;
an actuator configured to drive the two filter members; and
a controller configured to control the actuator,
wherein each of the stop and the two filter members is drivable,
wherein the two filter members are disposed so that a changing direction of a transmittance of the gradation part and a moving direction of one of the two filter members are opposite to a changing direction of a transmittance of the gradation part and a moving direction of the other of the two filter members respectively, and the first area has a size that covers an entirety of a first aperture, which is smaller than a full open stop aperture, and the transmissive part has a size that does not cover the entirety of the first aperture,
wherein the controller controls the actuator so as to move, without a halt of the two filter members, through an area between a first position where the first area of each of the two filter members is evacuated from the first aperture and a second position where the first area of each of the two filter members covers the entirety of the first aperture, the first aperture being an aperture when each of the two filter members is located at the second position,
wherein the transmissive parts of the two filter members are configured to not overlap with each other in a direction orthogonal to an aperture surface of the stop when the two filter members are disposed at the second position, and
wherein, while the two filter members are moving, without halting, through the area between the first position and the second position, the controller adjusts a light amount by controlling at least one of a size of the aperture of the stop, an electronic shutter velocity of an image pickup element, or a gain of the image pickup element to suppress a luminance change caused by a movement of the area between the first position and the second position.

2. The optical apparatus according to claim 1, further comprising:
a magnetic sensor configured to output a signal depending on positions of the two filter members,
wherein the controller controls the actuator based on the signal from the magnetic sensor when the two filter members are disposed at the first position, and controls the actuator so that the two filter members move through the area independently of the signal from the magnetic sensor when the two filter members are disposed in the area between the first position and the second position.

* * * * *